US008922830B2

(12) United States Patent
Samii et al.

(10) Patent No.: US 8,922,830 B2
(45) Date of Patent: Dec. 30, 2014

(54) MEDIA ROLL MANAGEMENT

(75) Inventors: Morad Samii, La Jolla, CA (US); Glenn T Gentile, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 451 days.

(21) Appl. No.: 13/255,899

(22) PCT Filed: Mar. 19, 2009

(86) PCT No.: PCT/US2009/037718
§ 371 (c)(1),
(2), (4) Date: Nov. 8, 2011

(87) PCT Pub. No.: WO2010/107438
PCT Pub. Date: Sep. 23, 2010

(65) Prior Publication Data

US 2012/0044535 A1 Feb. 23, 2012

(51) Int. Cl.

| | |
|---|---|
| ***G06K 15/00*** | (2006.01) |
| ***G06K 1/00*** | (2006.01) |
| ***B41J 29/38*** | (2006.01) |
| ***B41J 11/00*** | (2006.01) |

(52) U.S. Cl.
CPC ................ *B41J 29/38* (2013.01); *B41J 11/009* (2013.01)
USPC ........................................................... 358/1.9

(58) Field of Classification Search
None
See application file for complete search history.

(56) References Cited

U.S. PATENT DOCUMENTS

| | | | | |
|---|---|---|---|---|
| 5,816,165 | A | 10/1998 | Huston | |
| 5,947,408 | A | 9/1999 | Miyake | |
| 6,089,497 | A * | 7/2000 | Miyake | 242/563 |
| 6,112,653 | A | 9/2000 | Meyers | |
| 6,282,807 | B1 | 9/2001 | Johnson | |
| 2002/0020753 | A1 | 2/2002 | Innui et al. | |
| 2003/0071101 | A1 | 4/2003 | Nusbaum | |
| 2003/0145778 | A1 | 8/2003 | Judge | |
| 2008/0024578 | A1* | 1/2008 | Brewington et al. | 347/104 |
| 2008/0232882 | A1 | 9/2008 | Koie | |
| 2008/0232886 | A1 | 9/2008 | Kato et al. | |
| 2009/0236385 | A1* | 9/2009 | Itoh | 226/10 |

FOREIGN PATENT DOCUMENTS

| | | | |
|---|---|---|---|
| CN | 1135971 | | 11/1996 |
| CN | 1329546 | | 1/2002 |
| CN | 1744993 | | 3/2006 |
| JP | 63154566 | * | 6/1988 |
| JP | 6155868 | | 6/1994 |
| JP | 2001097621 | | 4/2001 |
| JP | 2001187662 | | 7/2001 |
| JP | 2002356031 | | 12/2002 |
| JP | 2006256097 | | 9/2006 |

OTHER PUBLICATIONS

JP-200118762-translation, Murai, Jul. 10, 2001.*
JP-2002079752-abstract.*
ISA/KR, International Search Report dated Nov. 24, 2009, PCT/US2009/037718 filed Mar. 19, 2009.

* cited by examiner

*Primary Examiner* — Fan Zhang

(57) ABSTRACT

A system and method for media roll management.

18 Claims, 7 Drawing Sheets

MEDIA ROLL MANAGEMENT

RELATED PATENT DATA

Cross-Reference to Related Application

This application claims priority to PCT Patent Application Serial No. PCT/US2009/1037718, which was filed on Mar. 19, 2009 which is herein included by reference in its entirety for all purposes.

BACKGROUND

Identifying and managing an attribute of a media roll conventionally involves a user manually inspecting the media roll and inputting details pertaining to the media roll whenever the media roll is inserted into the machine. Incorrect information may be introduced when a user mistakenly inputs inaccurate information, potentially wasting ink, media, other consumables, and leading to extended down time.

BRIEF DESCRIPTION OF THE DRAWINGS

Various features and advantages of the invention will be apparent from the detailed description which follows, taken in conjunction with the accompanying drawings, which together illustrate, by way of example, features of the invention and wherein.

DETAILED DESCRIPTION

The present invention differs from previous approaches by utilizing at least one optical sensor to scan a first mark and a second mark of a media roll to automatically identify at least one attribute of the media roll. A common practice for conventional media roll management is for a user to manually inspect the media roll in identify at least on attribute of the media roll. The user may then manually input at least one attribute of the media roll into the printing machine. As a result, a user may find that he/she may frequently expend a significant amount of time in inspecting the media roll and entering the information each time the media roll or an additional media roll is loaded onto OF removed from a printing machine. In addition, incorrect information may be inputted from human error, leading to additional down time, wasted ink, media, and other consumables. The present invention alleviates much of the stress and burden on the user by automatically identifying at least one attribute of the media roll when the media roll is loaded and automatically choosing a print mode on the printing machine.

Figure 1:
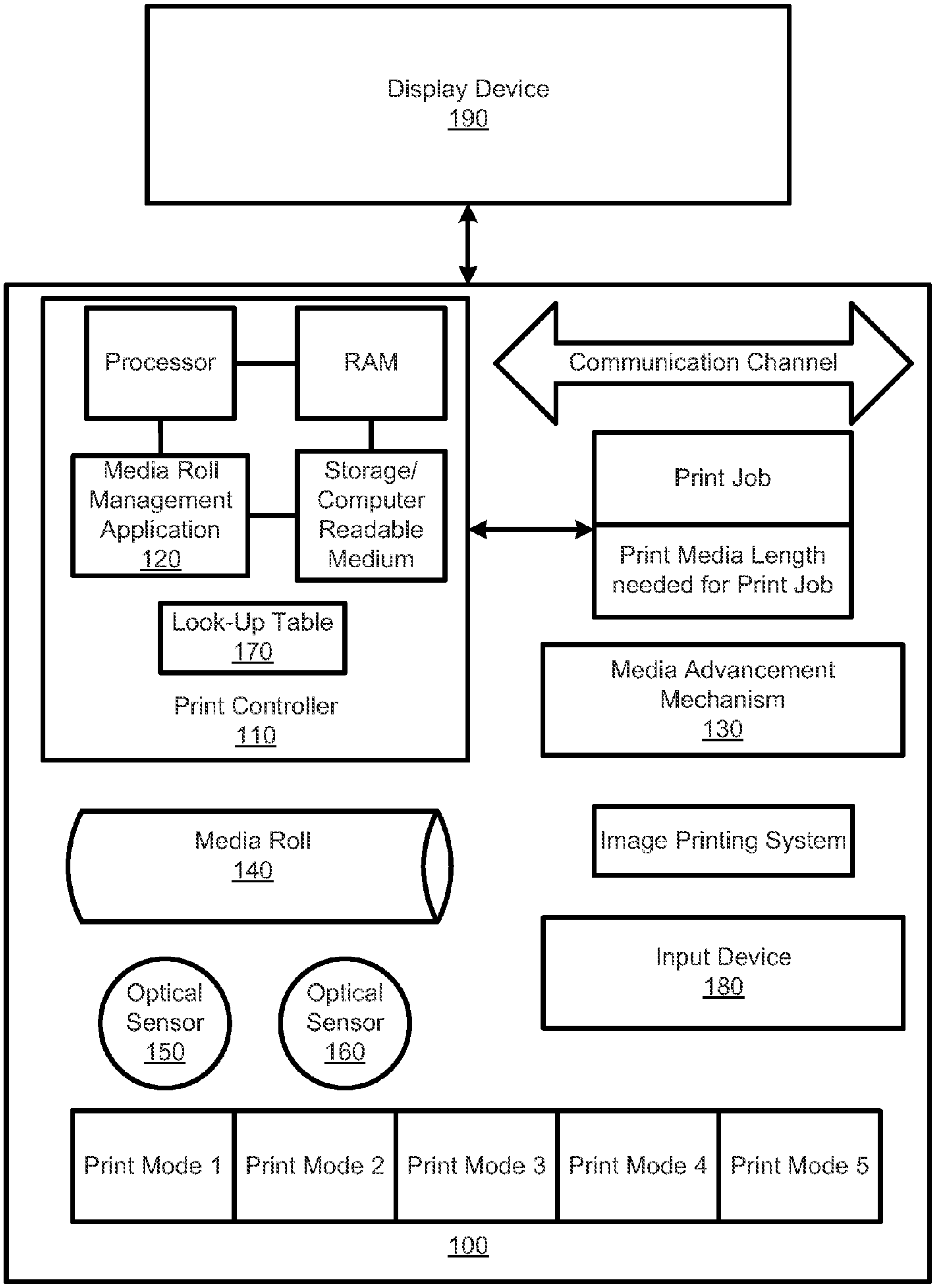
FIG. 1 illustrates a printing machine, various components and devices included in the printing machine, and various components and devices coupled to the printing machine according to an embodiment of the invention.

FIG. 1 illustrates a printing machine, various components and devices included in the printing machine, and various components and devices coupled to the printing machine according to an embodiment of the invention, A printing machine is a machine that may access print data from at least one print job to print one or more images, text, and/or patterns on one or more sides of media upon instruction. In one embodiment, the printing machine may be a web press. As illustrated in FIG. 1, the printing machine may include a print controller, at least one media FOIL a media advancement mechanism, and at least one optical sensor. In one embodiment, the printing machine may further include an image printing system, one or more communication channels, one or more print modes, an input device, a display device, and a print job, which may further include a print media length needed for the print job. Further, as illustrated in FIG. 1, the print controller which may further include a PROCESSOR, RAM, storage in the form of a computer readable medium, a look-up table, and a media roll management application. The printing machine may include additional devices and/or components and may be attached and/or connected to additional devices or components in addition to and/or in lieu of those depicted in FIG. 1.

As illustrated in FIG. 1, the printing machine 100 may include a media roll 140. A media roll 140 may be a roll of media that may be printed on by the printing machine 100 with an image printing system included in the printing machine 100. The image printing system may include one or more print head arrays or nozzles to print ink onto the media roll 140. The image printing system may receive an instruction from the printing machine 100 when the printing machine 100 has accessed a print job to be executed by the printing machine 100. A print job may include details of how many and what type of images, text, characters, patterns, and/or a combination of the above to print on the media. Additionally, the print job may include data of how large to print, where to print, and what type of ink to use when printing. Further, as illustrated in FIG. 1, the print job may include a print media length needed for the print job. The print media length may indicate the length of media from the media roll 140 needed in order to complete the print job.

In one embodiment, the media roll 140 may include a single sheet of the same type of printable media. In another embodiment, the media roll 140 may include multiple different sheets of different media types. Additionally, the media roll 140 may include a first mark and a second mark that may travel along the entire length of the media roll 140 on one or more sides of the media roll 140. Further, the media roll 140 may be mounted on the printing machine 100 manually by a user or automatically by the printing machine 100. When mounted, media from the media roll 140 may be advanced by a media advancement mechanism 130 on the printing machine 100. A media advancement mechanism 130 may include one or more rollers, one or more rotary encoders, and/or one or more rotating devices included in the printing machine 100 that may rotate the media roll 140 and advance media from the media roll 140 under at least one optical sensor.

While advancing the media on the media roll 140, at least one optical sensor 150, 160 coupled to the printing machine 100 may scan the first mark and the second mark on the media roll 140. At least one optical sensor 150, 160 may be a device coupled to the printing machine 100 that may scan and measure an intensity and/or brightness of light reflected from the first mark, the second mark, and a surface on the media roll 140 for a media management application 120 on the printing machine 100. Additionally, at least one optical sensor 150, 160 may be mounted in various positions of the printing machine 100 and may be configured to perform additional functions in addition to and/or in lieu of those noted above. In one embodiment, at least one optical sensor 150, 160 may scan the first mark and the second mark, or any other portion of the media roll 140 upon instruction by the media roll management application 120 or automatically at a predetermined period of time or when the media roll 140 is mounted or about to be un-mounted from the printing machine 100.

As illustrated in FIG. 1, the printing machine 100 may include or be coupled to at least one display device 190. At least one display device 190 may be a device that may output a still image or a moving image. Additionally, at least one display device may be a monitor, a touch screen, a television, a projector, or a holographic video display. Further, at least one display device 190 may be configured to output one or more messages to a user accessing the printing machine 100. In one embodiment, at least one display device 190 may be configured to output a message to a user when a current media roll length is insufficient to complete a print job. In another embodiment, at least one display device 190 may be configured to output an additional message for the user to replace the media roll 140 when the current media roll length is less than or has reached a previously defined length or percentage.

In addition, as illustrated in FIG. 1, the printing machine 100 may include at least one input device 180. At least one input device 180 may be a keyboard, mouse, microphone, scanner, and/or video camera that may capture one or more instructions and/or commands entered by a user. In one embodiment, at least one input device 180 may be utilized by a user to define an acceptable media roll 140 length value or percentage of media length remaining before at least one display device 190 may be configured to output a message to a user to replace the media roll 140. In another embodiment, at least one input device 180 may be utilized by the user to identify whether the media roll 140 is new or used. Additionally, the user may utilize at least one input device 180 to identify and/or define at least one attribute of the media roll 140.

As noted above, the printing machine 100 may include a printer controller 110, which may be used to control the printing machine 100 and further include a PROCESSOR, RAM, Storage/Computer Readable Medium, a look-up table 170, and a media roll management application 120. The media roll management application 120 may manage the operations of the printing machine 100, in conjunction with the print controller 110, by sending instructions to one or more components and/or devices included in the printing machine 100 and/or coupled to the printing machine 100. The media roll management application 120 may be firmware that is embedded onto the print controller 110 or the printing machine 100. Additionally, the media roll management application 120 may be a software application stored on the printer machine 100 through a storage medium readable and accessible by the printing machine 100 or the media roll management application 120 may be stored on a computer readable medium readable and accessible by the printing machine 100 from a different location. Further, the media roll management application 120 may be stored and/or accessed through a server coupled through a local area network or a wide area network. The media roll management application 120 may communicate with the print controller 110 and/or other additional devices and/or components coupled to the printing machine 100 physically or wirelessly through one or more communication channels included in or coupled to the printing machine 100.

The media roll management application 120 may be utilized to identify at least one attribute of the media roll 140 based on the first mark and the second mark. At least one attribute of the media roll 140 may include, but is not limited to, whether the media roll 140 is new or used, an identity of the media roll 140, at least one type of media included in the media roll 140, and/or a new or current length of the media roll 140.

When the media roll 140 is detected to be mounted onto the printing machine 100, the media roll management application 120 may initially instruct the media advancement mechanism 130 to begin advancing the media roll 140 so that a first mark and a second mark on the media roll 140 may be scanned by at least one optical sensor 150, 160. At least one optical sensor 150, 160 may measure an amount of light reflected from the marks and the media roll management application 120 may utilize the results from at least one optical sensor 150, 160 to determine a first mark frequency based on the first mark and a second mark frequency based on the second mark, The first mark frequency may be non-harmonic from the second mark frequency on the media roll 140. Additionally, the first mark frequency and the second mark frequency may include a uniformly spaced line pair.

In one embodiment, the media roll management application 120 may then determine whether the media roll 140 is new or used by detecting whether a user has accessed an input device and designated that the media roll 140 is new. In another embodiment, the media roll management application 120 may examine the first mark and the second mark when the media roll 140 is first mounted to determine whether the first mark includes the new media roll mark and whether the second mark includes the new media roll mark. A new media roll mark may be a marking that may be included in the first mark and/or the second mark. Additionally, the new media roll mark may be recognized by the media roll management application 120 and identify that the media roll 140 is new when both first mark and the second mark include the new media roll mark. In one embodiment, the new media roll mark may be a marking that is different from the first mark and the second mark.

After identifying whether the media roll 140 is new or used, the media roll management application 120 may continue to identify at least one additional attribute of the media roll 140 based on the first mark and the second mark and/or the first mark frequency and the second mark frequency. As noted above, at least one attribute of the media roll 140 may include an identity of the media roll 140, which may be identified by a stock keeping unit (SKU) identifier of the media roll or a ratio of the media roll 140. Further, at least one attribute may include at least one type of media included in the media roll 140 and a length of the media roll 140. The length of the media roll 140 may include when the media roll 140 is new or the current length of the media roll 140, when the media roll 140 is used.

After identifying at least one attribute of the media roll 140, the media roll management application 120 may automatically choose a print mode on the printing machine 100 in response to at least one attribute of the media roll 140. As illustrated in FIG. 1, the printing machine 100 may include one or more print modes. One or more print modes may be custom configurations that may modify one or more settings on the printing machine 100 to compliment at least one attribute of the media roll 140. In one embodiment, at least one attribute may indicate that the type of the media roll 140 is photo paper. As a result, print mode 3 may be automatically chosen by the media roll management application 120 to modify ink usage to insure that images printed on the media roll 140 are of high quality. In another embodiment, at least one attribute of the media roll 140 may indicate that the media roll 140 has a media length of less than 20% of the media roll 140 length remaining. The media roll management application 120 may then choose print mode 5, an alert mode and conservation mode, and prompt the user through display device 190 of the printing machine 100 to replace the media roll 140 while accepting print jobs that may not utilize a length greater than what is remaining.

After choosing a print mode on the printing machine 100, the media roll management application 120 may continue to scan for one or more print job requests. Before executing each print job, the media roll management application 120 may calculate a print media length, ink, and/or other consumables needed for the next print job and determine whether the length, ink, and/or other consumables of the media roll 140 is greater than the print length, ink, and/or other consumables needed for the next print job, thus using media more efficiently. In one embodiment, the printing machine 100 may include or have access to a look-up table 170. The look-up table 170 may include an entry for the corresponding media roll 140 and at least one attribute of the media roll 140. As noted above, one attribute may be the current length of the media roll 140. The media roll management application 120 may compare the value in the entry of the look-up table 170 to determine whether the current length is greater and whether the print job may be completed.

After each print job that the printing machine 100 executes, the media roll management application 120 may access the entry on the look-up table 170 and update the length of the media roll and/or at least one attribute of the media roll 140. Additionally, the look-up table 170 may be accessed and/or updated when the media roll 140 is mounted and/or un-mounted from the printing machine 100. Further, the look-up table 170 may be accessed and updated periodically when at least one optical sensor 150, 160 scans the media roll 140. The look-up table 170 may be utilized to create and/or update additional attributes stored on the entry of the look-up table 170 in addition to and/or in lieu of those noted above.

Figure 2:
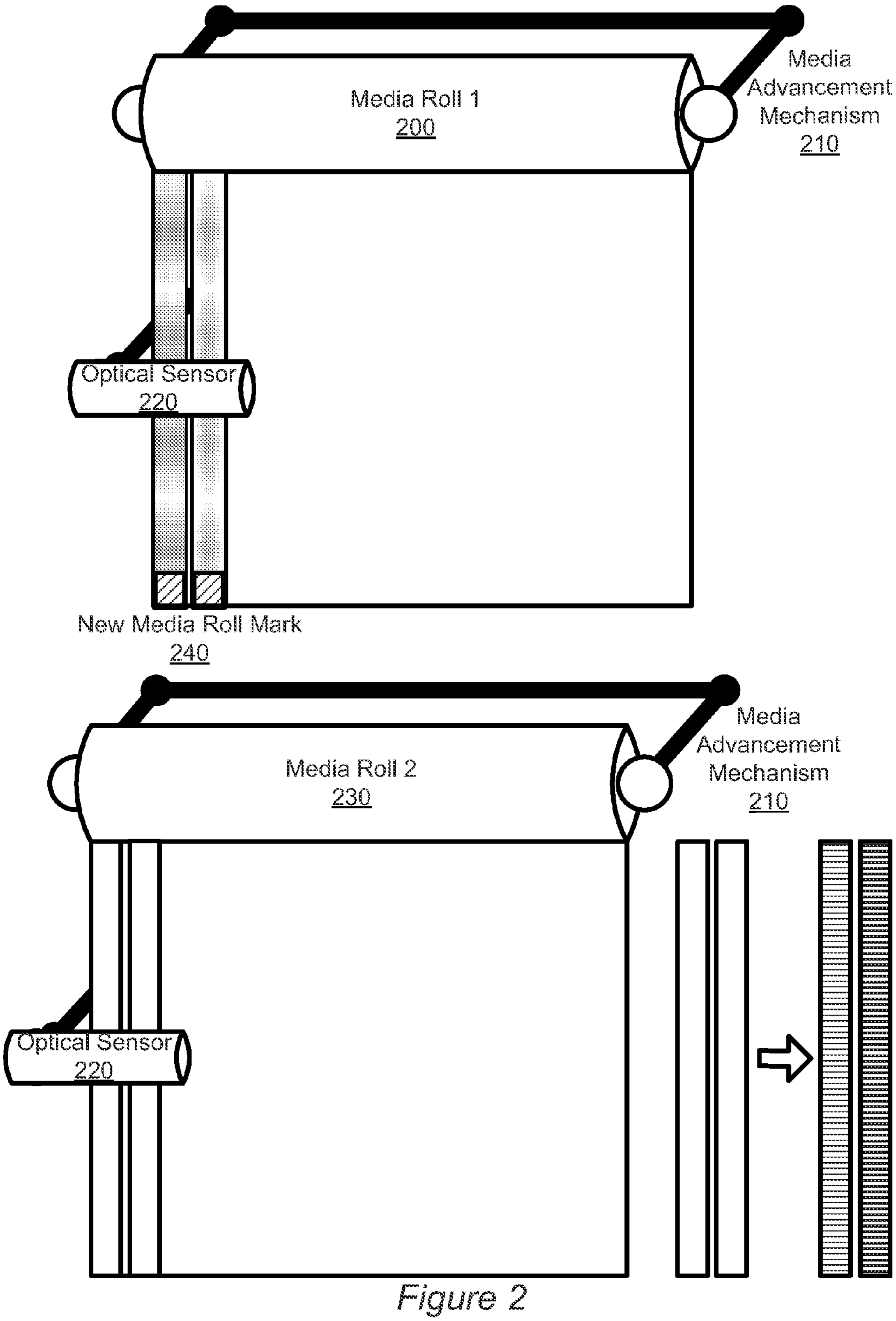
FIG. 2 illustrates at least one media roll with a first and a second mark being advanced by a media advancement mechanism and at least one optical sensor according to an embodiment of the invention.

FIG. 2 illustrates at least one media roll with a first and a second mark being advanced by a media advancement mechanism and at least one optical sensor according to an embodiment of the invention. As noted above, a media roll 200, 230 may be mounted onto a media advancement mechanism 210 on a printing machine. Further, the media advancement mechanism 210 may include one or more rollers, rotary encoders, and/or motors which may be in the shape of a sphere, cylinder, or any other uniformly round shape. Further, each roller may be mounted on a bar and/or rod, which may be attached to the printing machine and rotated. The media advancement mechanism 210 may be driven to rotate at various speeds by a motor whenever a print job is requested to be executed by the printing machine. Further, the rate and degree of rotation for the media advancement mechanism 210 may be adjusted by a print controller or a media roll management application sending instructions for the motor, connected to the roller, to accelerate or decelerate.

Additionally, in one embodiment, media roll 200, 230 may be a roll of one or more types of media. As noted above, media roll 200 and media roll 230 may include a first mark and a second mark printed along the entire length of the media rolls 200, 230. As illustrated on media roll 1 200, in one embodiment the first mark and the second mark may include analog marks and may be printed with visible ink on one side of media. Further, as shown in media roll 1 200, the first analog mark along the length of media roll 1 200 may include one or more analog marks that differs from the second analog mark along the length of the media roll 1 200.

Additionally, as noted above, at least one attribute of media roll 1 200, whether media roll 1 200 is new or used, may be identified. As illustrated in FIG. 2, the first analog mark and the second analog mark may include a new media roll mark 240 which may be utilized to identify that the media roll 1 200 is new. When at least one optical sensor 200 scans the first mark and the second mark and detects that both the first mark and the second mark include the new media roll mark 240, the media roll management application may identify media roll 1 200 as being new.

In another embodiment, as illustrated on media roll 2 230, the first mark and the second mark may be printed with invisible ink and may not be visible to a user. Additionally, the marks may be printed on the reverse side of media rolls 200, 230 and/or may be printed on both sides of the media rolls. Further, as illustrated in FIG. 2, the invisible first mark and the invisible second mark on media roll 2 230 may include digital marks. As shown on media roll 1 200 and media roll 2 230, in one embodiment, the first mark and the second mark may be adjacent to one another and may be printed along the entire length of the media roll 200, 230. Additionally, as illustrated by FIG. 2, the first mark and the second mark on media roll 1 200 and media roll 2 230 may be scanned by an optical sensor 220 that may scan and detect both visible and invisible printed marks. Further, the optical sensor 220 may scan and detect both analog and digital marks.

Figure 3A:
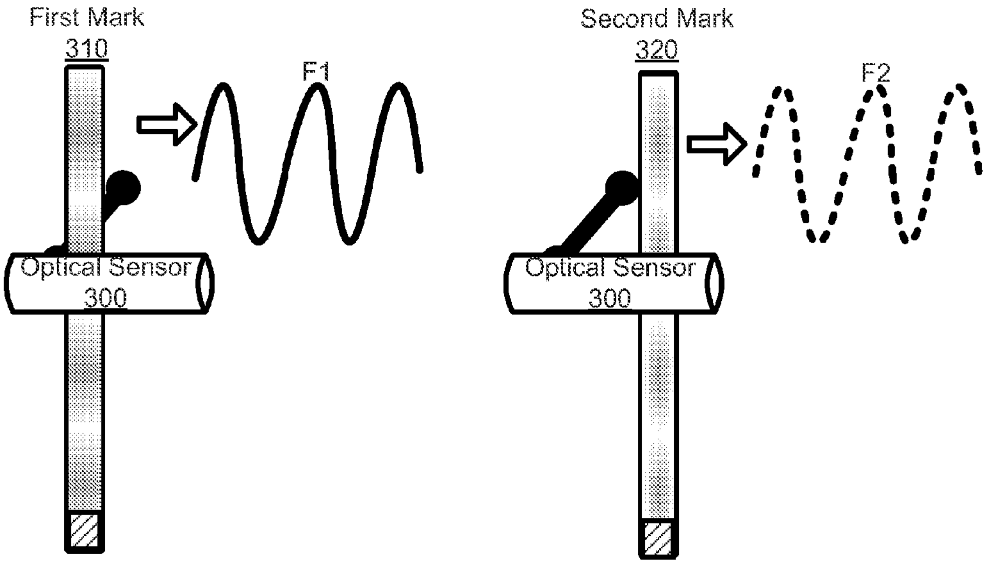
FIG. 3A and FIG. 3B illustrate at least one optical sensor scanning a first mark and a second mark of a media roll to determine a first mark frequency and a second mark frequency which may be used to identify at least one attribute of the media roll for a look-up table according to an embodiment of the invention.
Figure 3B:
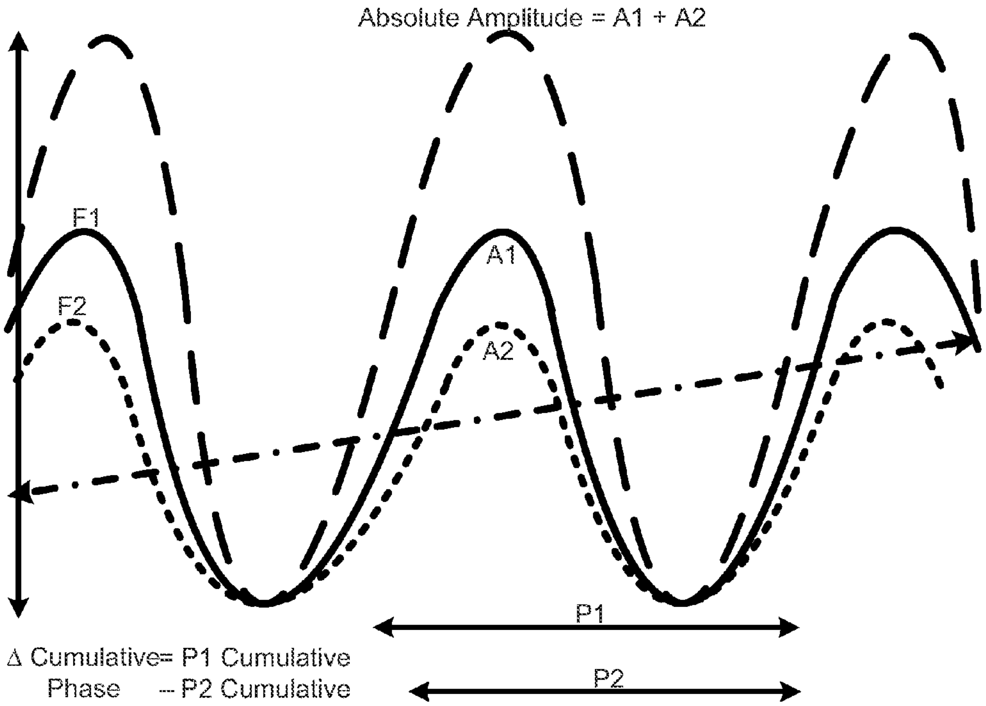

FIG. 3A and FIG. 3B illustrate at least one optical sensor scanning a first mark and a second mark of a media roll to determine a first mark frequency and a second mark frequency which may be used to identify at least one attribute of the media roll for a look-up table according to an embodiment of the invention. As illustrated in FIG. 3A, at least one optical sensor 300 may be utilized to scan a first analog mark 310 and a second analog mark 320. Further, as illustrated in FIG. 3A, in one embodiment, the first analog mark 310 and the second analog mark 320 may be analog marks and may be scanned by optical sensor 300. As noted above, optical sensor 300 may be used to scan the brightness or intensity of light reflected from the analog or digital marks as media from a media roll passes under the optical sensor 300. In one embodiment, optical sensor 300 may be utilized to scan the first mark and an additional optical sensor may be utilized to scan the second mark.

As illustrated in FIG. 3A, optical sensor 300 may scan the first analog mark 310 and detect the amount of light reflected and/or the intensity of the reflected light from the first analog mark 310. The optical sensor 300 may scan the first mark 310 upon instruction by a media roll management application on the printing machine. The media roll management application may utilize the results from optical sensor 300 to determine a frequency Fl of the first mark 310. In one embodiment, the media roll management application may instruct the optical sensor 300 to further scan the second analog mark 320 on the media roll after scanning the first analog mark 310 to determine a frequency F2 of the second analog mark 320. In another embodiment, the optical sensor 300 may scan the first analog mark 310 and the second analog mark 320 simultaneously in parallel.

As illustrated in FIG. 3B, the first frequency F1 and the second frequency F2 may not be harmonic with one another. Additionally, as shown in FIG. 3B, the first frequency F1 may include a sinusoidal pattern that is non-harmonic with an additional sinusoidal pattern of the second frequency F2. Further, F1 and F2 may not be equal and may not be divisible by one another. In addition, if one non-harmonic frequency F1 is even, then the other non-harmonic frequency F2 may be odd. As illustrated in FIG. 3B, frequencies F1 and F2 are not identical and may overlap once at a first phase of both frequencies.

As noted above, the first frequency F1 and the second frequency F2 may be utilized to identify at least one attribute of the media roll. At least one attribute may be the current length or the remaining length of the media roll. The current length of the media roll may be identified by combining the amplitude of F1 with the amplitude of F2 to determine an absolute amplitude. As illustrated in FIG. 3B, the absolute amplitude and the current length may then be determined by combining A1 with A2. In identifying the amplitudes, the media roll event manager may initially determine the phases of F1 and F2. As illustrated by FIG. 33, a first phase F1 may be identified from F1 and a first amplitude A1 may be identified from P1. The first phase P1 may be a fraction of a complete cycle of frequency F1. The first amplitude A1 may represent a magnitude of change in the first phase P1. Further, a second phase P2 may be identified from F2 and a second amplitude A2 may be identified from P2.

Additionally, at least one attribute may be an identify of the media roll based on a ratio of the media roll. The ratio of the media roll may be an absolute amplitude over a cumulative phase. In another embodiment, the ratio of the media roll may be the cumulative phase over the absolute amplitude. As illustrated in FIG. 3B, the cumulative phase may be determined by taking the cumulative of P1 and subtracting the cumulative of P2. The ratio of the media roll may be compared to a list of ratios in one or more entries of a look-up table. If the ratio is found, with a matching absolute amplitude and cumulative phase, then a match may be found and the identity of the media roll may be listed in the look-up table.

Figure 4:
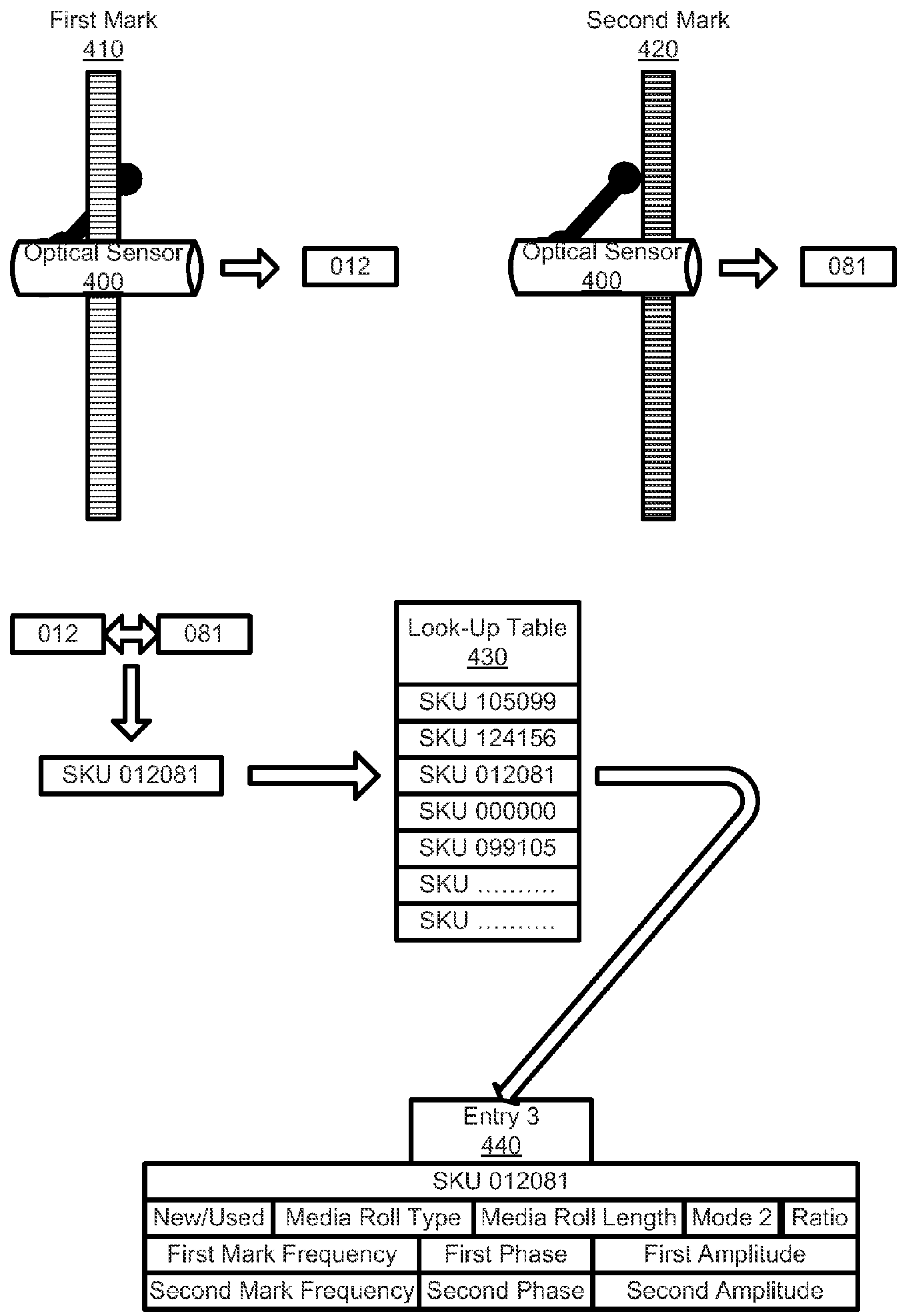
FIG. 4 illustrates at least one optical sensor scanning a first mark and a second mark of a media roll in identifying at least one attribute of the media roll for a look-up table according to an embodiment of the invention.

FIG. 4 illustrates at least one optical sensor scanning a first mark and a second mark of a media roll in identifying at least one attribute of the media roll for a look-up table according to an embodiment of the invention. As noted above, at least one attribute of a media roll may include, but is not limited to whether the media roll is new or used, an identity of the media roll, at least one type of media included in the media roll, and a length of the media roll. Further as noted above and as illustrated in FIG. 4, a first mark 410 and a second mark 420 of a media roll may include one or more digital marks. The digital marks on the first mark 410 and the second mark 420 may comprise multiple lines. As noted above and illustrated in FIG. 4, the first digital mark 410 and the second digital mark 420 may be different.

As noted above, an identify of the media roll may be determined using a SKU of the media roll and/or a ratio of the media roll. In one embodiment, a media roll management application may initially attempt to identify a SKU of the media roll. In identifying the SKU of the media roll, the media roll management application may instruct optical sensor 400 to initially measure a lines per inch of the first mark 410. A lines per inch of the first mark 410 may be the number of lines comprised in an inch of the first digital mark 410. The media roll management application may utilize the optical sensor 400 to count a number of lines included in an inch of the first digital mark 410. The media roll management application may then proceed to measure a number of lines per inch of the second digital mark 420. After identifying the number of lines per inch of the first digital mark 410 and the number of lines per inch of the second digital mark 420, the media roll management application may determine the SKU of the media roll.

As illustrated in FIG. 4, the media roll management application may determine that the first digital mark 410 is comprised of 012 lines per inch. The media roll management application may further determine that the second digital mark 420 may be comprised of 081 lines. The media roll management application may then utilize the first lines per inch as a first half of the SKU and the second lines per inch as a second half of the SKU. As illustrated in FIG. 4, the media roll management application may identify the SKU of the media roll as SKU 012081. After identifying the SKU, the media roll management application may access a look-up table 430 and scan each entry for SKU 012081.

A look-up table 430 may be a database that may be accessible by the printing machine and/or the media roll management application. The look-up table 430 may include one or more entries and within each entry may include details of a corresponding media roll. Additionally, the look-up table 430 may be updated to include one or more new entries. Further, in one embodiment, existing entries may be modified and/or updated whenever the media roll is mounted onto the printing machine. In another embodiment, one or more entries may be modified and/or updated after each print job or periodically whenever at least one optical sensor 400 scans the media roll.

If the media roll SKU is not found in any entry in the look-up table 430, the media roll management application may proceed to determine the ratio of the media roll to scan for a match or automatically create a new entry for the look-up table of the new SKU. In addition, the media roll management application may prompt a user to create an entry and include one or more details in the entry for the media roll when the information may not already exist in the look-up table 430. In another embodiment, as illustrated in FIG. 4, the media roll SKU 012081 may be found as entry 3 440 in the look-up table 430. The media roll management application may then access at least one detail of entry 340. As illustrated in FIG. 4, entry 3 440 may include the media roll SKU, the media roll ratio, whether the media roll is new or used, the current length of the media roll, a printing mode, a first mark frequency, phase, amplitude, and a second mark frequency, phase, and amplitude.

Additionally, as noted above, at least one attribute of the media roll may be the type of media included in the media roll. The media roll management application may determine at least one type of media included in the media roll. If the SKU is found as an entry in the look-up table 430, the media roll management application may scan the entry for at least one type of media included in the media roll. If the SKU is not found as an entry, in addition to creating a new entry, the media roll management application may proceed to identify the type of media included in the media roll by outputting an instruction to a user through a display device prompting the user to specify at least one media type included in the media roll. In another embodiment, the media roll management application may prompt the optical sensor 400 to scan a surface on the media roll to attempt to identify the type of media included in the media roll. The optical sensor may determine the amount of light reflected from the surface of the media roll and/or an intensity of light reflected from the surface of the media roll and the media roll management application may compare these values to existing media type values listed in look-up table 430. After identifying the type of media, the entry may be populated or updated with at least one identified type of media.

Further, as noted above, a print mode may be automatically chosen based on at least one attribute of the media roll. As illustrated in FIG. 4, in one embodiment, the entry 3 440 may include the print mode 2. Additionally, as noted above, after each print job, at least one detail of entry 3 440 in the look-up table 430 may be updated to include the current and updated media roll length, the current ratio, the current first mark frequency, current first phase, current first amplitude, and the current second mark frequency, current second phase, and current second amplitude. In updating the media roll length after each print job, the media roll management application may proceed to determine the length of media needed for the next print job, which may be included in at least one detail of a print job, and subtract the print job length from the current length after the print job is completed. Additionally, as noted above, the media roll management application may combine to the first mark amplitude and the second mark amplitude to determine the current length of the media roll.

Figure 5:
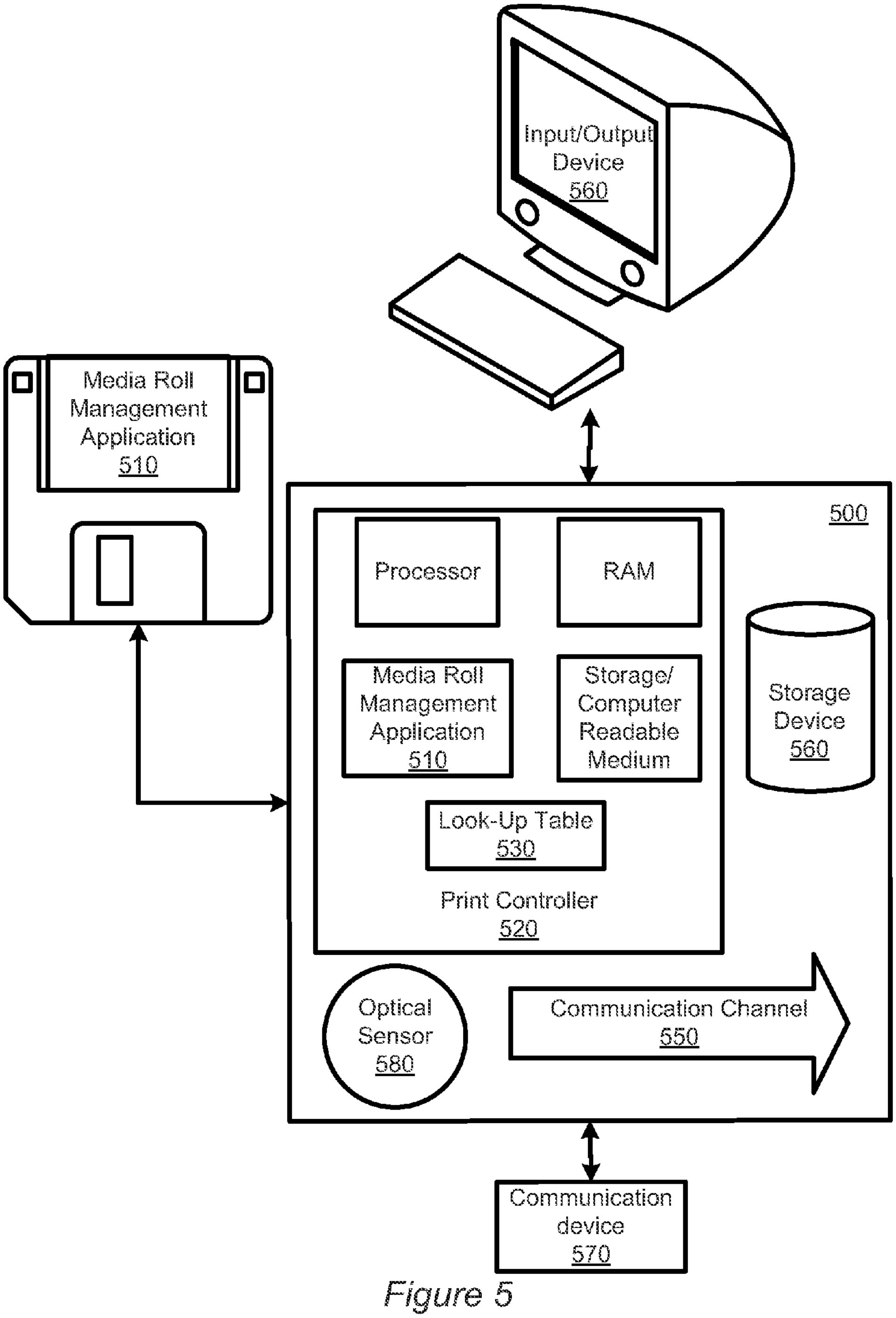
FIG. 5 illustrates a media roll management application that may be embedded into the printing machine and/or may be stored on a removable medium being accessed by a printing machine according to an embodiment of the invention.

FIG. 5 illustrates a media roll management application 510 that may be embedded into the printing machine 500 and/or may be stored on a removable medium being accessed by a printing machine 500 according to an embodiment of the invention. As noted above, the media roll management application 510 may control and/or manage the hardware components of the printing machine 500 by sending instructions and/or commands to each component of the printing machine 500 independently or in conjunction using one or more communication channels 550. Additionally, the media roll management application 510 may utilize at least one optical sensor 580 on the printing machine 500 to scan a first mark and a second mark on a media roll to identify at least one attribute of the media roll in conjunction with a look-up table.

Further, as noted above, the media roll management application 510 may be firmware that may be imbedded into one or more components of the printing machine 500. Additionally, the media roll management application 510 may be a software application which may be stored and accessed from a hard drive, a compact disc, a flash disk, a network drive or any other form of computer readable medium that is coupled to the printing machine 500. In one embodiment, the media roll management application 510 may be stored on a server or another device that may or may not be connected to the printing machine 500. The printing machine 500 may utilize a communication device 570 in conjunction with a local area network or a wide area network to store and access the media roll management application 510. The media roll management application 510 may be stored and accessed from additional devices in addition to and/or in lieu of those depicted in FIG. 5.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one of ordinary skill within the relevant art and having possession of this disclosure, are to be considered within the scope of the invention.

Figure 6:
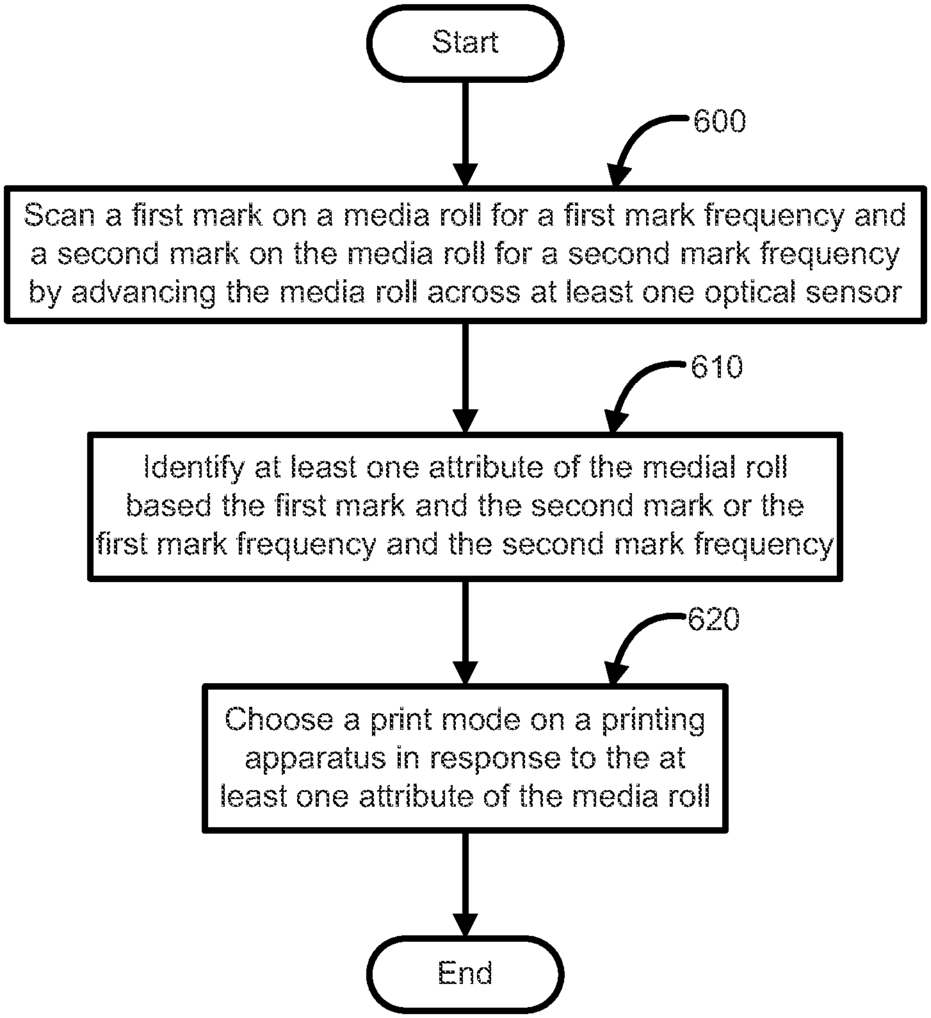
FIG. 6 is a flow chart illustrating a method for media roll management according to an embodiment of the invention.

FIG. 6 is a flow chart illustrating a method for media roll management according to an embodiment of the invention. The method of FIG. 6 may utilize a printing machine which may include one or more printing modes, a media roll with a first mark and a second mark mounted onto the printing machine, a media advancement mechanism for the media roll, at least one optical sensor to scan the first mark and the second mark, and a media roll management application. The method of FIG. 6 may utilize additional components and/or devices in addition to and/or in lieu of those depicted in FIGS. 1, 2, 3, 4, and 5.

The media roll management application may initially scan a first mark on a media roll for a first frequency and a second mark on the media roll for a second frequency by advancing the media roll across at least one optical sensor 600. After determining the first frequency and the second frequency, the media roll management application may then identify at least one attribute of the medial roll based the first mark and the second mark or the first mark frequency and the second mark frequency 610. In response to the at least one attribute of the media roll, the media roll management application may choose a print mode on a printing machine 620. The method for media roll management may then be complete or the media roll management application may continue to scan the first mark and the second mark of the media roll or an additional media roll and repeat the method disclosed above. The system or media roll management application may utilize additional methods for managing a media roll in addition to and/or in lieu of those depicted in FIG. 6.

Figure 7:
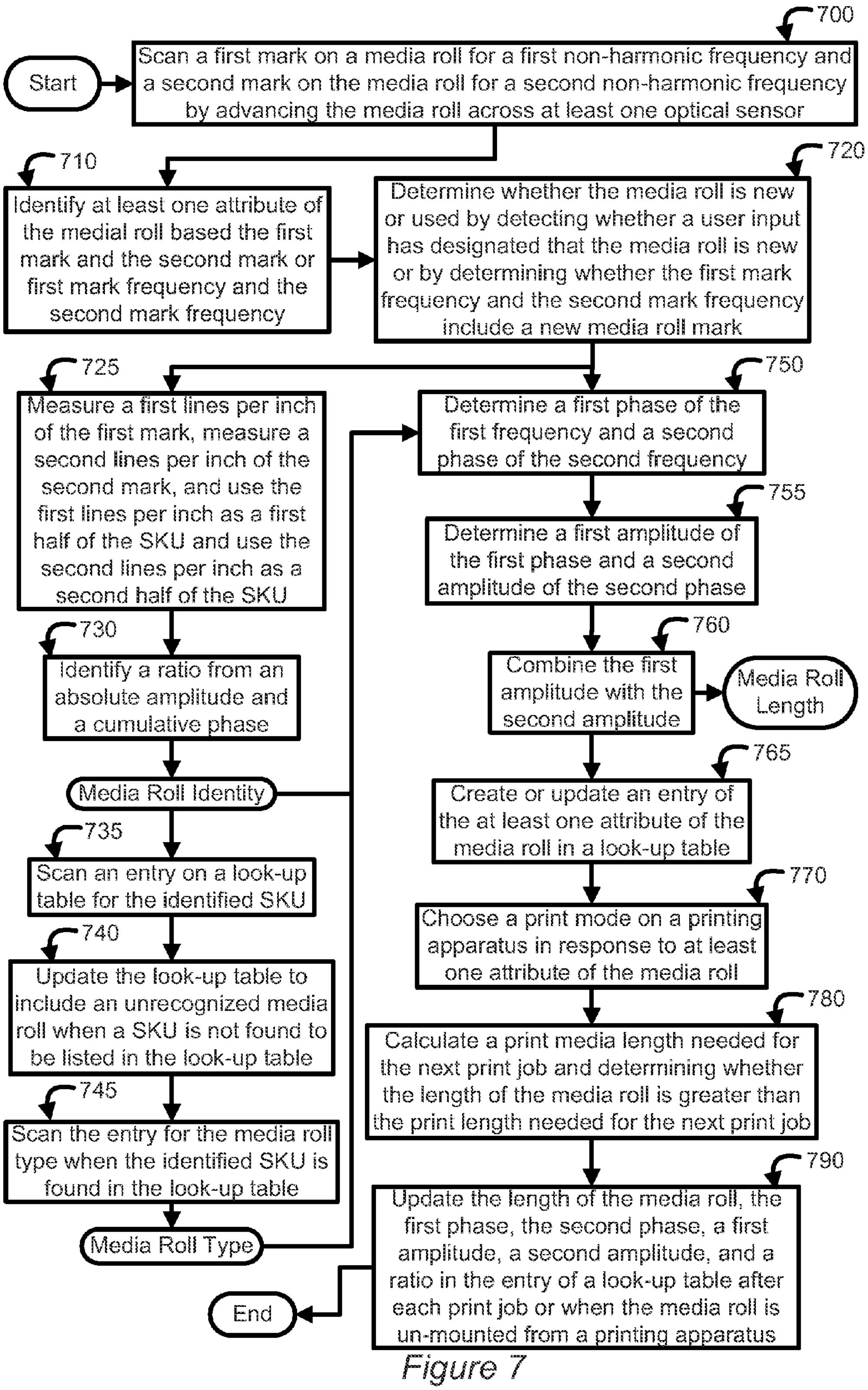
FIG. 7 is a flow chart illustrating a method for identifying at least one attribute of a media roll by scanning a first mark and a second mark of the media roll according to an embodiment of the invention.

FIG. 7 is a flow chart illustrating a method for identifying at least one attribute of a media roll by scanning a first mark and a second mark of the media roll according to an embodiment of the invention. The method of FIG. 7 may utilize one or more print modes on a printing machine, a media roll with a first mark and a second mark mounted onto the printing machine, a media advancement mechanism for the media roll, at least one optical sensor to scan the first mark and the second mark, a look-up table with one or more entries, and a media roll management application. The method of FIG. 7 may utilize additional components and/or devices in addition and/or in lieu of those depicted in FIGS. 1, 2, 3, 4, and 5.

As illustrated in FIG. 7, the media roll management application may initially scan a first mark on a media roll for a first non-harmonic frequency and a second mark on the media roll for a second non-harmonic frequency by advancing the media roll across at least one optical sensor 700. The media roll management application may then use the first mark and the second mark or the first mark frequency and the second mark frequency to identify at least one attribute of the medial roll 710. As noted above, at least one attribute may include, but is not limited to, whether the media roll is new or used, an identity of the media roll, a media type included in the media roll, and/or a length of the media roll.

The media roll management application may initially determine whether the media roll is new or used by detecting whether a user input has designated that the media roll is new or by determining whether the first mark and the second mark both include a new media roll mark 720. After identifying whether the roll is new or used, the media roll management application determine an identity of the media roll. In identifying the identity of the media roll, the media roll management application may measure a first lines per inch of the first mark, measure a second lines per inch of the second mark, and use the first lines per inch as a first half of the SKU and the second lines per inch as a second half of the SKU 725. Additionally, the media roll management application may determine the media roll by identifying a ratio of the media roll with an absolute amplitude and a cumulative phase using the first mark frequency and the second mark frequency 730.

In addition, in one embodiment, after identifying the media roll, the media roll management application may proceed to scan an entry on a look-up table for the identified SKU 735. If the SKU is not found to be listed in the look-up table, the look-up table may be updated to include an unrecognized media roll 740. If the SKU is found to be listed in an entry of the look-up table, the media roll management application may proceed to scan the entry for the media roll type 745. As noted above, the media roll management application may additionally prompt at least one optical sensor to scan a surface of the media roll to determine the media roll type. The media roll management application may then determine the media roll length with an absolute amplitude. As illustrated in FIG. 7, in identifying the media roll length, the media roll management application may initially determine a first phase of the first frequency and a second phase of the second frequency 750. The media roll management application may then determine a first amplitude of the first phase and a second amplitude of the second phase 755. With the amplitude of the first mark and the amplitude of the second mark, the media roll management application may proceed to determine the absolute amplitude by combining the first amplitude with the second amplitude to identify the length of the media roll 760.

After identifying at least one attribute of the media roll, the media roll management application may proceed manage the media roll by creating or updating an entry of the at least one attribute of the media roll in a look-up table 765. As noted above, the entry may include the media roll SKU, the media roll ratio, whether the media roll is new or used, the media roll type, the media roll length, a printer mode for the media roll, a first mark frequency, a first phase, a first amplitude, a second mark frequency, a second phase, and/or a second amplitude.

After creating or updating an entry of the at least one attribute of the media roll, the media roll management application may automatically choose a print mode on a printing machine in response to at least one attribute of the media roll 770. As noted above, the print mode may include specific settings for the printing machine used to compliment the media roll. After a print mode has been chosen, the media roll management application may calculate a print media length needed for the next print job and determining whether the length of the media roll is greater than the print length needed for the next print job 780. Further, the media roll management application may update the length of the media roll, the first phase, the second phase, a first amplitude, a second amplitude, and a ratio of the media roll, and/or at least one additional attribute of the media roll in the entry of a look-up table after each print job or when the media roll is un-mounted from a printing machine 790.

The method for identifying at least one attribute of a media roll by scanning a first mark and a second mark of the media roll may then be complete or the media roll management application may continue to scan the media roll and repeat the method disclosed above. The system or media roll management application may utilize additional methods for identifying at least one attribute of the media roll and automatically choosing a print mode in addition to and/or in lieu of those depicted in FIG. 7.

What is claimed is:

1. A printing machine comprising:
- a media advancement mechanism coupled to the printing machine;
- a media roll mounted on the media advancement mechanism;
- at least one optical sensor coupled to the printing machine and configured to scan a first non-harmonic mark and a second non-harmonic mark on the media roll;
- a processor coupled to a print controller and a computer readable medium;
- a media roll management application executable from the print controller or the computer readable medium, wherein the media roll management application is to:
  - determine a first frequency of the first non-harmonic mark;
  - determine a second frequency of the second non-harmonic mark;
  - identify at least one attribute of the media roll based on the first frequency and the second frequency; and
  - update the at least one attribute of the media roll to a look-up table,
    - wherein the at least one attribute of the media roll includes a length of the media roll, and
  - wherein the length of the media roll is identified by:
    - determining a first phase of a first mark frequency of the firs non-harmonic mark and a second phase of a second mark frequency of the second non-harmonic mark;
    - determining a first amplitude of the first phase and a second amplitude of the second phase; and
    - determining an absolute amplitude of the media roll by combininig the first amplitude with the second amplitude.

2. The printing machine of claim 1, wherein the first non-harmonic mark is adjacent to the second non-harmonic mark on the media roll and the first non-harmonic mark and the second non-harmonic mark run along an entire length of the media roll.

3. The printing machine of claim 1, wherein the first non-harmonic mark and the second non-harmonic mark are analog or digital marks.

4. The printing machine of claim 1, wherein the first non-harmonic mark and the second non-harmonic mark are printed with invisible ink.

5. The printing machine of claim 1, further comprising a display device to output a message to a user when a current length of the media roll is insufficient to complete a print job or to output an additional message for the user to replace the media roll when the current length of the media roll is less than a previously defined length or percentage.

6. The printing machine of claim 1, wherein the first non-harmonic mark and the second non-harmonic mark are disposed on at least one of a front side or a back side of the media roll, and wherein the printing machine is to print on at least the front side of the media roll.

7. A method for media roll management comprising:
- scanning a first mark on a media roll and a second mark on the media roll by advancing the media roll across at least one optical sensor;
- determining a first mark frequency from the first mark and a second mark frequency from the second mark, wherein the first mark frequency and the second mark frequency are non-harmonic;
- identifying at least one attribute of the media roll based on the first mark frequency and the second mark frequency; and
- choosing a print mode on a printing machine in response to the at least one attribute of the media roll, wherein the at least one attribute of the media roll includes a length of the media roll, and wherein the length of the media roll is identified by:
  - determining a first phase of the first mark frequency and a second phase of the second mark frequency;
  - determining a first amplitude of the first phase and a second amplitude of the second phase; and determining an absolute amplitude of the media roll by combining the first amplitude with the second amplitude.

8. The method for media roll management of claim 7, wherein the at least one attribute of the media roll is an identity of the medial roll from a stock keeping unit (SKU) of the media roll; and wherein the SKU of the media roll is identified by:

measuring a first lines per inch of the first mark and using the first lines per inch as a first half of the SKU; and measuring a second lines per inch of the second mark and using the second lines per inch as a second half of the SKU.

9. The method for media roll management of claim 8, wherein the at least one attribute of the media roll includes a media type of the media roll, and wherein the media type is determined by:

scanning an entry on a look-up table for the identified SKU;

scanning the entry for the media roll type when the identified SKU is found in the look-up table; and scanning the media roll with the at least one optical sensor for an amount of light reflected and an intensity of the light reflected when the identified SKU is not found in the look-up table.

10. The method for media roll management of claim 7, further comprising:

determining whether the length of the media roll is sufficient to complete a next print job by calculating a print media length needed for the next print job; and determining whether the length of the media roll is greater than the print length needed for the next print job.

11. The method for media roll management of claim 7, further comprising updating the length of the media roll in an entry of a look-up table after each print job.

12. The method for media roll management of claim 7, wherein the first mark and the second mark are disposed on at least one of a front side or a back side of the media roll, and wherein the printing machine is to print on at least the front side of the media roll.

13. The method for media roll management of claim 7, wherein the first mark and the second mark run in parallel along an entire length of the media roll.

14. A non-transitory computer-readable medium storing:

a media roll management application to:

scan a first mark on a media roll for a first frequency and a second mark on the media roll utilizing at least one optical sensor;

determine a first frequency of the first mark and a second frequency of the second mark;

identify at least one attribute of the media roll using the first frequency and the second frequency, wherein the first frequency and the second frequency are non-harmonic;

create or update an entry of the at least one attribute of the media roll in a look-up table; and update the look-up table to include an unrecognized media roll when a stock keeping unit (SKU) from the first frequency and the second frequency is not found to be listed in the look-up table.

15. The non-transitory computer-readable medium of claim 14, wherein the media roll management application is further to determine whether the media roll is new or used by detecting whether a user has designated that the media roll is new or by determining whether the first mark includes a new media roll mark and whether the second mark includes the new media roll mark.

16. The non-transitory computer-readable medium of claim 14, wherein the media roll management application is further to:

update a current length of the media roll stored in the entry of the at least one attribute of the media roll in the look-up table after each print job;

update a first phase of the first frequency and a second phase of the second frequency in the entry of the at least one attribute of the media roll in the look-up table after each print job or when the media roll is un-mounted from a printing machine; and update a first amplitude of the first phase and a second amplitude of the second phase in the entry of the at least one attribute of the media roll in the look-up table after each print job.

17. The non-transitory computer-readable medium of claim 14, wherein the first mark and the second mark are disposed on at least one of a front side or a back side of the media roll, and wherein a printing machine is to print on at least the front side of the media roll.

18. The non-transitory computer-readable medium of claim 14, wherein the first mark and the second mark run in parallel along an entire length of the media roll.

* * * * *

UNITED STATES PATENT AND TRADEMARK OFFICE

CERTIFICATE OF CORRECTION

PATENT NO. : 8,922,830 B2
APPLICATION NO. : 13/255899
DATED : December 30, 2014
INVENTOR(S) : Morad Samii et al.

It is certified that error appears in the above-identified patent and that said Letters Patent is hereby corrected as shown below:

In the Drawings

In sheet 6 of 7, reference numeral 610, line 2, delete “based the” and insert -- based on the --, therefor.

In sheet 7 of 7, reference numeral 710, line 2, delete “based the” and insert -- based on the --, therefor.

In the Claims

In column 12, line 18, in Claim 1, delete “firs” and insert -- first --, therefor.

In column 12, line 24, in Claim 1, delete “combininig” and insert -- combining --, therefor.

Signed and Sealed this
Fifth Day of April, 2016

Michelle K. Lee
*Director of the United States Patent and Trademark Office*